United States Patent
Horisawa

(10) Patent No.: US 6,332,651 B1
(45) Date of Patent: Dec. 25, 2001

(54) SEAT FOR VEHICLE

(75) Inventor: Kouta Horisawa, Kanagawa (JP)

(73) Assignee: Ikeda Bussan Co., Ltd., Ayase (JP)

( * ) Notice: Subject to any disclaimer, the term of this patent is extended or adjusted under 35 U.S.C. 154(b) by 0 days.

(21) Appl. No.: 09/384,090

(22) Filed: Aug. 27, 1999

(30) Foreign Application Priority Data

Aug. 27, 1998 (JP) ................................................. 10-240925

(51) Int. Cl.[7] .................................................... A47C 7/02
(52) U.S. Cl. .................................. 297/452.11; 297/284.1; 297/219.1
(58) Field of Search ........................... 297/284.1, 440.14, 297/219.1, 230.13, 228.13, 452.11

(56) References Cited

U.S. PATENT DOCUMENTS

| | | | |
|---|---|---|---|
| 4,883,320 | * | 11/1989 | Izumida et al. .................... 297/284.1 |
| 5,407,248 | * | 4/1995 | Jay et al. ............................ 297/284.1 |
| 5,758,924 | * | 6/1998 | Vishey ............................ 297/219.1 X |
| 5,826,937 | * | 10/1998 | Massara ......................... 297/284.1 X |
| 5,904,400 | * | 5/1999 | Wei ................................. 297/284.1 X |
| 6,019,428 | * | 2/2000 | Coffield ......................... 297/284.1 X |
| 6,022,075 | * | 2/2000 | Blocker et al. ................ 297/219.1 X |

\* cited by examiner

*Primary Examiner*—Peter M. Cuomo
*Assistant Examiner*—Stephen Vu
(74) *Attorney, Agent, or Firm*—Foley & Lardner

(57) ABSTRACT

A seat for a vehicle includes a seat frame having a major middle portion made of a resin, at least a part of the major middle portion having a net structure. A covering member for covering the major middle portion is detachably engaged with the seat frame such that, when the covering member is detached from the seat frame, at least a part of the net structure of the seat frame is exposed, thereby producing a ventilation. During the summer season the covering member can be detached from the major middle portion thereby providing high ventilation for the seat, while during the winter season the covering member can be engaged with the major middle portion thereby providing a high heat retaining property for the seat.

10 Claims, 3 Drawing Sheets

SEAT FOR VEHICLE

BACKGROUND OF THE INVENTION

1. Field of the Invention

The present invention relates in general to a seat for a vehicle which can be modified easily and desirably by user for summer use or winter use.

2. Description of the Prior Art

A seat for a vehicle is likely to become hot and stuffy during the summer season since a seat occupant is seated for a long time in a constant attitude. The seat, therefore, requires higher ventilation in summer than in winter. It is possible to replace in summer and winter a once equipped seat. However, replacing the seat so often requires high cost. If the ventilation is a sole concern, to solve it there is provided a seat in which the air can be conductive from inside a pad to a surface thereof via a fan. This method requires a complicated construction as well as high cost. More generally known is a method of using special materials for the pad and outer skin member with high ventilation. However, the higher the ventilation is, the lower the heat retaining property is. In other words, the seat occupant feels chilly in winter. To control the ventilation and heat retaining property, a seat cover for covering the outer skin member used to be replaced in summer and winter.

SUMMARY OF THE INVENTION

It is, therefore, an object of the present invention to provide a seat having a simple construction and securing the seat occupant's comfort.

There is a seat for a vehicle, according to the present invention. This seat comprises a seat frame which has a major middle portion made of a resin. At least a part of the major middle portion has a net structure. This seat further comprises a covering member for covering the major middle portion. The covering member is detachably engaged with the seat frame such that, when the covering member is detached from the seat frame, at least a part of the net structure of the seat frame is exposed, thereby providing a ventilation.

DESCRIPTION OF THE PREFERRED EMBODIMENTS

Figure 1:
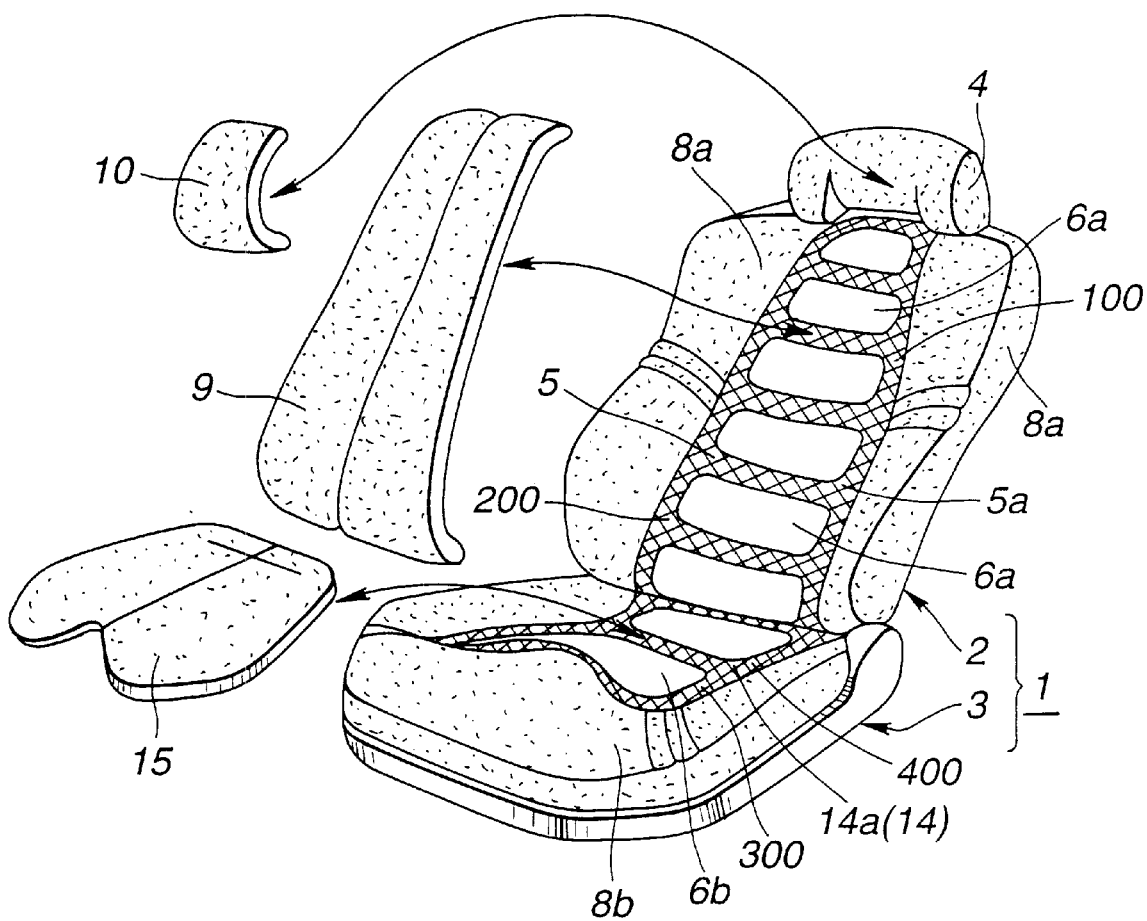
FIG. 1 is an exploded view showing a seat in perspective according to a preferred embodiment of the present invention.

As is seen from FIG. 1 through FIG. 5, there is provided a seat 1 for a vehicle, according to a preferred embodiment of the present invention. This seat 1 has a seat back 2 and a seat cushion 3, with a head rest 4 integrally connected with the seat back 2 at an upper end portion thereof.

The seat 1 has a seat frame that is a combination of a seat back frame 5 and a seat cushion frame 14.

The seat back frame 5 is made through an injection molding method. As is seen from FIG. 4, the seat back frame 5, which is one-piece in construction and is made of a resin material, has a major middle portion 5a, and a pair of sub side portions 5b disposed on both sides of the major middle portion 5a. The major middle portion 5a supports a seat occupant's weight. The major middle portion 5a has a plurality of through openings 100 which are regularly arranged and which provide a ventilation permitting structure that has a net-like appearance and that will hereinafter be referred to as a net structure 200. As is seen from FIG. 1, the major middle portion 5a has six pads 6a disposed at a predetermined distance on a surface of the major middle portion 5a. Around each of the six pads 6a, the net structure 200 is exposed in a manner depicted in FIG. 1. Each pad 6a is made of a soft resin material. The seat back frame 5 may be integrally molded with the pads 6a at the same time. Alternatively, the seat back frame 5 and the pads 6a may be molded separately in order to mount the pads 6a on the major middle portion 5a. The sub side portion 5b is integrally covered with an outer skin member 8a covering a side pad 7a.

The seat back 2 has a surface covering member 9 for covering a front surface of the major middle portion 5a and blocking ventilation through the upper portion of the net structure 200 and blocking ventilation through the lower portion of the net structure. The surface covering member 9 is detachably engaged with the seat back frame 5. The seat back 2 further has a surface covering member 10 for covering a surface of a head rest 4 (See FIGS. 1 and 2). As is seen from FIGS. 3 and 4, the seat back 2 further has a seat back garnish 11 for covering a back surface of the major middle portion 5a. The seat back garnish 11 is detachably engaged with the seat back frame 5. Each of the surface covering members 9 and 10 are made of a heat retaining material. As is seen from FIG. 4, the surface covering member 9 has, on a back surface thereof, binder members 12a and 12b. The binder members 12a and 12b are penetrated through the net structure 200, which is exposed, and are unbindably coupled with each other on the back surface of the major middle portion 5a. Using the binder members 1²a and 12b, the surface covering member 9 is detachably engaged with the major middle portion 5a to cover the same. The surface covering member 10 also has binder members similar to those for the surface covering member 9, and is mounted in a manner similar to that of the surface covering member 9. Instead of such binder members 12a and 12b, a fastener (not shown), which is like the after-mentioned fastener 13 of the seat back garnish 11, can be used for detachably engaging the surface covering members 9 and 10. The seat back garnish 11 is a molded article made of resin, and has dimensions to cover the entire area of the back surface of the major middle portion 5a. The seat back garnish 11 has a plurality of fasteners 13, each of which is used as a latching member and is projectively disposed on the seat back garnish 11. Although not shown in detail in FIG. 4, the fastener 13 has an end which is formed like a hook in shape. When the seat back garnish 11 is pushed against the back surface of the major middle portion 5a, the fastener 13 is hooked with the net structure 200. The fastener 13 can be unhooked according to need.

The seat cushion frame 14 is made through an injection molding method. As is seen from FIG. 5, the seat cushion frame 14, which is one-piece in construction and is made of a resin material, has a major middle portion 14a and a pair of sub side portions 14b disposed on both sides of the major middle portion 14a. The major middle portion 14a supports the seat occupant's weight. The major middle portion 14a has a plurality of through openings 300 which are regularly arranged, thereby forming a net structure 400. As is seen from FIG. 1, the major middle portion 14a has two pads 6b disposed at a predetermined distance on a surface of the major middle portion 14a. Around each of the two pads 6b, the net structure 400 is exposed in a condition shown in FIG. 1. Like the pad 6a on the seat back 2, the pad 6b is made of a soft resin material. The seat cushion frame 14 may be integrally molded with the pads 6b at the same time. Alternatively, the seat cushion frame 14 and the pads 6b may be molded separately in order to mount the pads 6b on the major middle portion 14a. The sub side portion 14b and a front side of the seat cushion 3 are integrally covered with an outer skin member 8b covering a side pad 7b.

Figure 2:
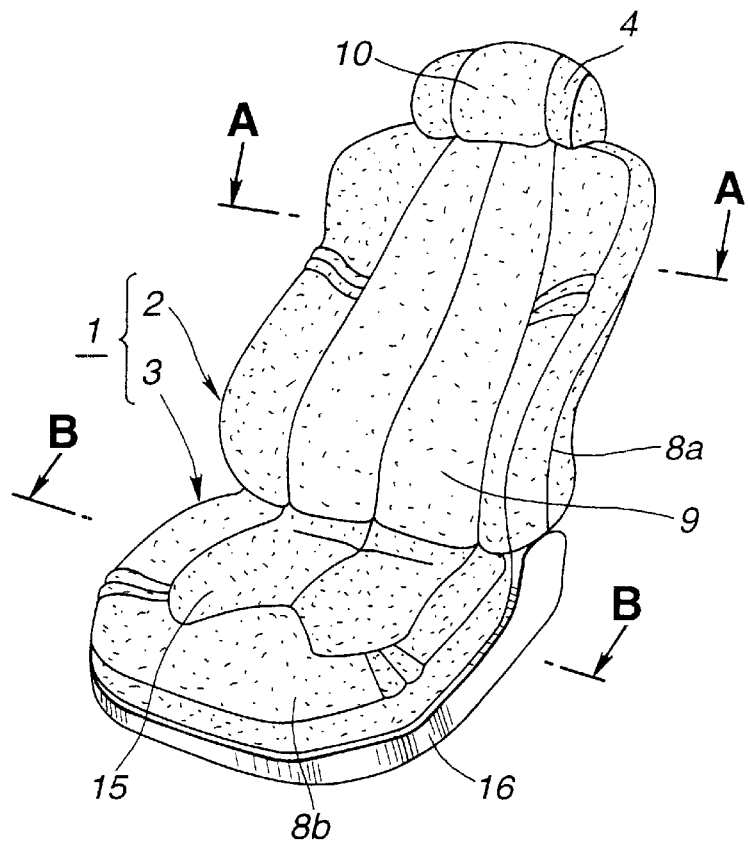
FIG. 2 is a view similar to FIG. 1 but showing the seat assembled.
Figure 3:
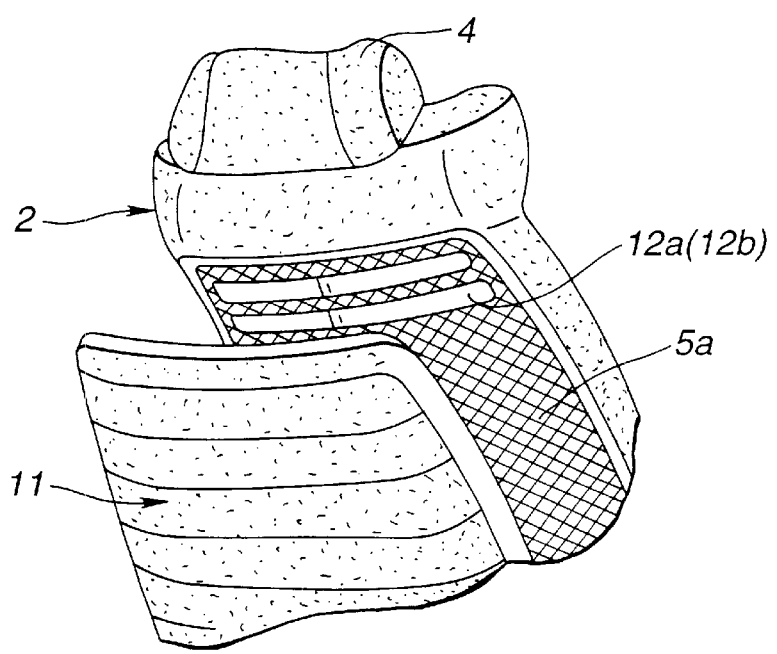
FIG. 3 is a backside view of the seat in FIG. 1.
Figure 4:
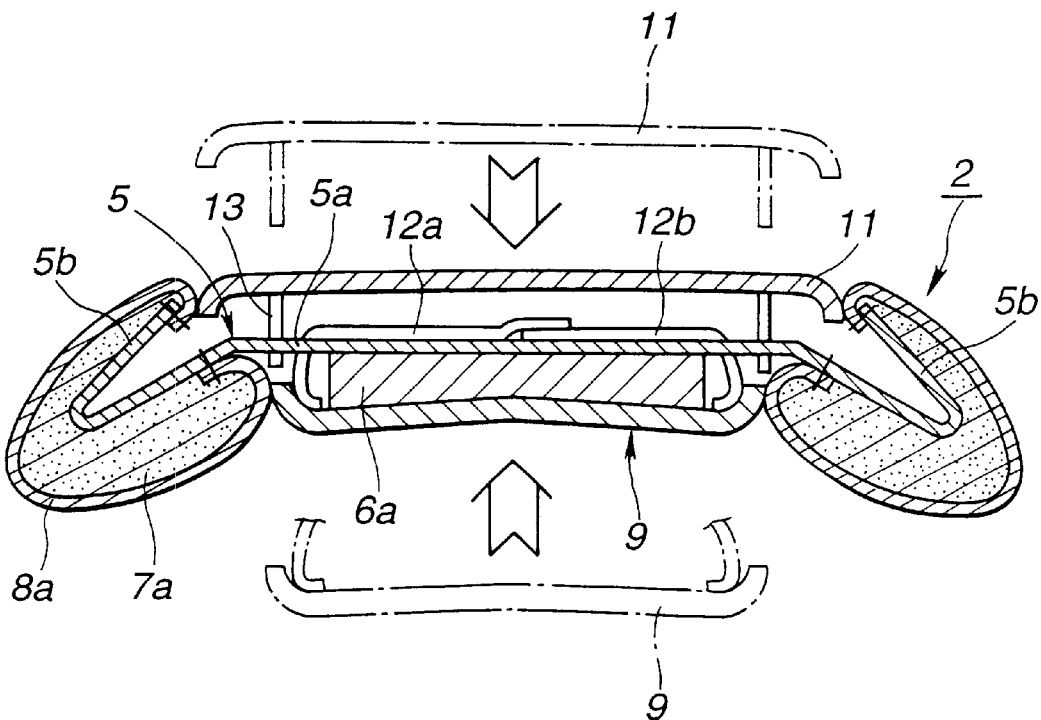
FIG. 4 is a cross section taken along lines A—A of FIG. 2.
Figure 5:
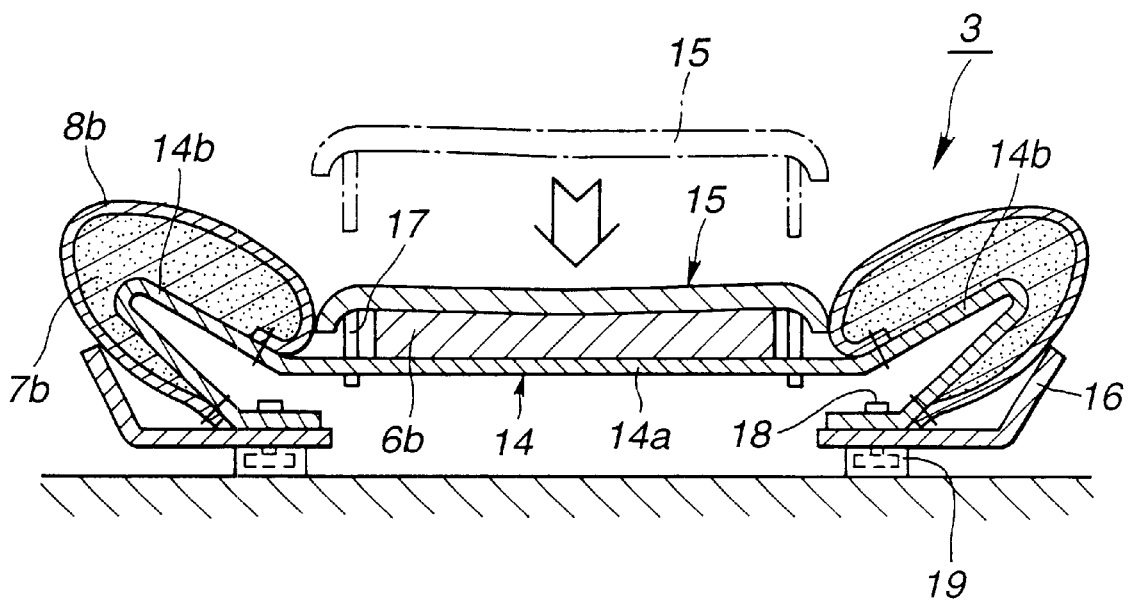
FIG. 5 is a cross section taken along lines B—B of FIG. 2.

As is seen from FIGS. 1, 2 and 5, the seat cushion 3 further has a surface covering member 15 for covering a front surface of the major middle portion 14a and blocking ventilation through the lower portion of the net structure. The surface covering member 15 is detachably engaged with the seat cushion frame 14. Like the surface covering member 9 on the seat back 2, the surface covering member 15 is made of a heat retaining material. As is seen from FIG. 5, a fastener 17, which is equivalent to the fastener 13, is projectively disposed on a back surface of the surface covering member 15. The fastener 17 is formed like a hook in shape. When the surface covering member 15 is pushed against an upper surface of the major middle portion 14a, the fastener 17 is hooked with the net structure 400. The fastener 17 can be unhooked according to need. As is seen from FIGS. 2 and 5, the seat cushion 3 further has a covering body 16, which is fixed on a lower side of the seat cushion frame 14, for covering a periphery at a lower portion of the seat cushion 3. A pair of the covering bodies 16 have a size to conceal a lower end portion of the seat cushion 3. Each of the covering bodies 16 is like a generally "L" in shape. The covering body 16 is fixed to the seat cushion frame 14 using a fastener 18 and a mounting bracket 19 disposed on the floor.

Summarizing above, the seat 1 for a vehicle has a construction in which the surface covering members 9 and 15 can be detachably engaged with the net structures 200 and 400 to cover the major middle portions 5a and 14a. Likewise, the surface covering member 10 can be detachably engaged with the head rest 4. When the surface covering members 9 and 15 are detached and thereby the major middle portions 5a and 14a are exposed, a high ventilation can be provided for the seat 1. This condition is desired for summer season. When the surface covering members 9 and 15 are engaged with the seat frame, a high heat retaining property can be provided for the seat 1. This condition is desired for winter season.

The surface covering members 9, 10 and 15 can be made of a foamed material or a soft resin material. Furthermore, each of the surface covering members 9, 10 and 15 can be made into a water-proof bag member having a pad therein.

What is claimed is:

1. A seat for a vehicle, comprising:
    a seat frame having a major middle portion made of a resin, at least a part of said major middle portion having a plurality of through openings formed therein to form a ventilation permitting structure, said seat frame being adapted to comfortably support a person seated directly thereon, so that the ventilation permitting structure, at least in part, enables cooling ventilation about a portion of the body of the seated person; and
    a readily detachable covering member for selectively covering said major middle portion under predetermined temperature conditions, said covering member being selectively engageable with said seat frame such that, when said covering member is attached to said seat frame, at least a portion of the plurality of through openings in said seat frame is covered, thereby preventing ventilation.

2. The seat according to claim 1, wherein said covering member is detachably engaged with said net structure.

3. The seat according to claim 1, wherein said seat further comprises a seat back garnish for covering a back surface of said major middle portion of said seat frame, said seat back garnish being detachably engaged with said seat frame.

4. The seat according to claim 3, wherein said seat back garnish is detachably engaged with said net structure.

5. A seat for a vehicle, comprising:
    a seat frame having a major middle portion made of a resin, at least a part of said major middle portion having a net structure comprised of a plurality of regularly spaced ventilating through holes formed through the major middle portion;
    a selectively removable ventilation preventing covering member for covering said major middle portion, said covering member being detachably engaged with said seat frame such that, when said covering member is detached from said seat frame, at least a part of said net structure of said seat frame is exposed, thereby enabling the exposed net structure to provide ventilation between said seat frame and a person seated on said seat frame; and
    a plurality of pads disposed at predetermined intervals along a surface of said major middle portion of said seat frame, said pads being made of a soft resin.

6. The seat according to claim 5, wherein each of the pads is surrounded by said net structure.

7. The seat according to claim 1, wherein said seat further comprises a seat back and a seat cushion, mid wherein said net structure is formed on each of said seat back and said seat cushion.

8. A seat for a vehicle comprising:
    a seat frame comprising:
        a major middle portion made of a resin,
        a ventilation structure formed in said major middle portion, said ventilation structure comprising a plurality of regularly spaced through holes; and
        a plurality of soft resin pads disposed in spaced openings formed along a middle portion of the major middle portion so as to be each surrounded by the ventilation structure.

9. The seat according to claim 8, further comprising a ventilation preventing cover which is detachably connectable to at least the major middle portion when cooling ventilation is not wanted.

10. The seat according to claim 9, wherein the ventilation preventing cover is made of a material having a high heat retaining property.

* * * * *